United States Patent
Michaelsen et al.

(10) Patent No.: US 9,950,702 B2
(45) Date of Patent: Apr. 24, 2018

(54) METHOD FOR STABILIZING THE DRIVING BEHAVIOR OF A TRACTOR-TRAILER COMBINATION AND VEHICLE MOVEMENT DYNAMICS CONTROL DEVICE

(71) Applicant: WABCO GmbH, Hannover (DE)

(72) Inventors: Arne Michaelsen, Seelze (DE); Tobias Munko, Hannover (DE)

(73) Assignee: WABCO GmbH, Hannover (DE)

( * ) Notice: Subject to any disclaimer, the term of this patent is extended or adjusted under 35 U.S.C. 154(b) by 175 days.

(21) Appl. No.: 14/917,761

(22) PCT Filed: Jul. 17, 2014

(86) PCT No.: PCT/EP2014/001945
§ 371 (c)(1),
(2) Date: Mar. 9, 2016

(87) PCT Pub. No.: WO2015/036069
PCT Pub. Date: Mar. 19, 2015

(65) Prior Publication Data
US 2016/0214586 A1 Jul. 28, 2016

(30) Foreign Application Priority Data
Sep. 10, 2013 (DE) .......................... 10 2013 014 819

(51) Int. Cl.
*B60T 7/20* (2006.01)
*B60T 8/1755* (2006.01)
(Continued)

(52) U.S. Cl.
CPC ........ *B60T 8/17554* (2013.01); *B60R 16/023* (2013.01); *B60T 7/12* (2013.01);
(Continued)

(58) Field of Classification Search
CPC .... B60T 8/17554; B60T 8/1708; B60T 8/243; B60T 8/323; B60T 8/3255; B60T 7/12;
(Continued)

(56) References Cited

U.S. PATENT DOCUMENTS 6,225,894 B1 * 5/2001 Kyrtsos .................... B60Q 1/52
180/282
6,424,907 B1 * 7/2002 Rieth ................. B60G 17/0162
340/438

(Continued)

FOREIGN PATENT DOCUMENTS

DE 19751867 A1 5/1999
DE 69707148 T2 3/2002
(Continued)

OTHER PUBLICATIONS

European Patent Office, Rijswijk, Netherlands, International Search Report of International Application No. PCT/EP2014/001945, dated Sep. 30, 2014, 2 pages.

*Primary Examiner* — Edwin A Young
(74) *Attorney, Agent, or Firm* — Brinks Gilson & Lione (57) ABSTRACT

In a method for stabilizing the driving behavior of a tractor-trailer combination, a tilting inclination variable is obtained and a tilting limit is determined on the basis of the tilting inclination variable and is prescribed to a vehicle movement dynamics control system. A vehicle movement dynamics control device carries out the method. In order to improve the stabilization of the driving behavior of tractor-trailer combinations with different loads of the individual vehicles, the respective tilting inclination variable is determined at a plurality of vehicles of the tractor-trailer combination, and the value of the tilting inclination variable for the determination of the tilting limit which is decisive for the determination of the tilting limit is obtained from the tilting inclination variables.

11 Claims, 4 Drawing Sheets

(51) Int. Cl.
*B60T 8/17* (2006.01)
*B60T 8/24* (2006.01)
*B60T 8/32* (2006.01)
*B60T 7/12* (2006.01)
*B60R 16/023* (2006.01)

(52) U.S. Cl.
CPC .............. *B60T 7/20* (2013.01); *B60T 8/1708* (2013.01); *B60T 8/243* (2013.01); *B60T 8/323* (2013.01); *B60T 8/3255* (2013.01); *B60T 2230/03* (2013.01)

(58) Field of Classification Search
CPC ...... B60T 7/20; B60T 2230/03; B60W 10/10; B60W 10/18; B60W 2520/16; B60W 2520/18; B60W 2520/20; B60W 2520/22
See application file for complete search history.

(56) References Cited

U.S. PATENT DOCUMENTS

2007/0017715 A1    1/2007  McCann
2011/0112723 A1*   5/2011  Reich ................... B60T 8/1708
                                                        701/41

FOREIGN PATENT DOCUMENTS

| DE | 103 59 216 A1 | 2/2005 |
| DE | 10 2004 035 579 A1 | 2/2006 |
| EP | 0 737 608 A2 | 10/1996 |
| EP | 0 918 003 A2 | 5/1999 |
| EP | 1 592 592 A2 | 11/2005 |
| EP | 1 812 261 A1 | 8/2007 |
| GB | 2 447 689 A | 9/2008 |
| WO | 2013/066216 A1 | 5/2013 |

* cited by examiner

METHOD FOR STABILIZING THE DRIVING BEHAVIOR OF A TRACTOR-TRAILER COMBINATION AND VEHICLE MOVEMENT DYNAMICS CONTROL DEVICE

TECHNICAL FIELD

The invention relates to a method for stabilizing the driving behavior of a tractor-trailer combination comprising a tractor and at least one trailer. The invention also relates to a vehicle movement dynamics control device for carrying out the method having a control unit acting on the drive and/or the brakes of the tractor-trailer combination.

BACKGROUND

Vehicle movement dynamics control systems are electronically controlled driving assistance systems for motor vehicles, wherein the driving behavior of the vehicle is stabilized by control interventions in the drive and/or the brakes. For example, the veering off of a vehicle can be counteracted by targeted braking of individual wheels. Vehicle movement dynamics control systems can be configured, for example, as anti-lock brake systems or traction control systems and are often combined with an electronic brake system, in particular in utility vehicles.

Vehicle movement dynamics control systems which are intended to prevent rollover of the vehicle while taking into account a tilting limit, are referred to as "Roll Stability Control" (RSC). The RSC function is often implemented as an additional function of a vehicle movement dynamics control system.

Roll stability systems can effectively prevent utility vehicles from tilting by selective control interventions if the tilting limit can be reliably obtained. Tilting limit is understood here to mean the maximum lateral acceleration above which tilting of the vehicle is possible. The tilting limit is determined in addition to vehicle-specific parameters, in particular of the height of the center of gravity. In particular in utility vehicles with a high center of gravity, a low tilting limit is given when the load is unfavorable.

EP 1 592 592 B1 discloses such an RSC vehicle movement dynamics control system. In order to increase the driving stability of a utility vehicle, instability of the vehicle is counteracted by control interventions into a control system which activates the drive and/or the brakes of the vehicle, wherein in the known method the control intervention is intended to take place as a function of a ratio between the height of the center of gravity of the vehicle and a spring constant of the vehicle suspension system.

In tractor-trailer combinations, that is to say combinations of one tractor with at least one trailer, different mass distributions between the tractor and the trailers are actually not taken into account with the conventional RSC control systems. The tilting limits can vary in different vehicles and can differ from one another significantly as a result of different cargos of individual vehicles. If one of the vehicles which are connected together is heavily loaded to a critical extent in terms of tilting, while another vehicle is traveling empty and there is therefore a low risk of tilting, tilting may occur when cornering. In order to avoid this, the vehicle movement dynamics control system is to be configured with a corresponding compromise between protection against tilting and drivability. However, during journeys with uniform distribution of the cargo in the vehicles of the tractor-trailer combination this results frequently in control interventions which are not necessary for the driving stability and are experienced as unpleasant by the driver of the vehicle.

EP 0 737 608 B1 relates to a method for determining the ratio of the mass of a road train and the mass of the tractor, wherein a braking force distribution between the vehicle axles is determined at the tractor. If the vehicle has an air suspension system, the axle load and therefore, in turn, the cargo can be inferred from the necessary bellows pressure, as result of which the total mass of the vehicle is to be determined. The masses of the other vehicles of the road train are obtained by multiplying the mass of the one vehicle with the obtained ratios between the masses.

SUMMARY OF THE INVENTION

The present invention is based on the problem of providing a method for stabilizing the driving behavior of a tractor-trailer combination and of a vehicle movement dynamics control device for carrying out the method, which method and device improve the stabilization of the driving behavior of tractor-trailer combinations with different loads or cargos of the individual vehicles of a tractor-trailer combination.

According to one aspect of the invention, in a tractor-trailer combination with a plurality of vehicles, respective tilting inclination variables are determined for a plurality of vehicles or each vehicle and the value of the tilting inclination variable which is decisive for the determination of a tilting limit is selected from the tilting inclination variables which are available as a result. The tilting inclination variable is a physical variable which influences the inclination of the vehicle to tilt under the effect of lateral acceleration. If the tilting inclination of a plurality of vehicles or of each vehicle of the tractor-trailer combination is determined individually, the vehicle movement dynamics control system can take into account the individual load state of individual vehicles and therefore, on the one hand, reliably avoid tilting even in extremely different load states. Furthermore, control interventions which are actually superfluous and which often also have to be accepted in non-critical situations for the sake of anti-tilting protection in the case of conventional RSC control systems with a uniform tilting limit for the entire tractor-trailer combination are avoided.

The value of the tilting inclination variable which is decisive for the determination of the tilting limit is determined according to the invention from the respective tilting inclination variables of individual vehicles, wherein additional information about the driving state of the tractor-trailer combination or of individual vehicles of the tractor-trailer combination can be used to consider individual vehicles separately. Such information is often present in any case in electronic systems of individual vehicles and can be employed for the separate determination of individual tilting inclination variables and, if appropriate, of individual tilting limits at low cost. Therefore, signals which are present in the respective vehicle can additionally be used to adapt in an optimum way RSC control interventions of the current load of vehicles of tractor-trailer combinations and the corresponding mass distribution.

The vehicle movement dynamics control device according to another aspect of the invention comprises a plurality of devices which are assigned to individual vehicles of the tractor-trailer combination and have the purpose of determining respective tilting inclination variables of the respective vehicle. These devices can be arranged in an electronic central processor unit in which the RSC control function is integrated, wherein there is a signal-transmitting connection to devices in the individual vehicles.

In an advantageous embodiment of the invention, the individual tilting inclination variable of that vehicle of the tractor-trailer combination which inclines most to tilting is selected as the decisive value of the tilting inclination variable for the determination of the tilting limit of the vehicle movement dynamics control system. In this way, an optimal compromise is provided between anti-tilting protection for the tractor-trailer combination and the drivability of the tractor-trailer combination with the fewest possible control interventions by the vehicle movement dynamics control device. The tilting limit is here the intervention threshold for the lateral acceleration, at which or above which the vehicle movement dynamics control system performs a control intervention and actuates the drive or the engine management system and/or the brakes of individual vehicles, or of all the vehicles, of the tractor-trailer combination.

The tilting inclination variable can be predefined or measured or derived from measured values. In one embodiment, the lifting off of individual wheels or a tendency to lift off is detected in order to generate a tilting inclination variable. For this purpose, the slip of individual wheels is detected by corresponding sensors when cornering or during test braking operations.

In one particularly preferred embodiment of the invention, the center of gravity of the respective vehicle is determined as a tilting inclination variable. The center of gravity of the vehicle, and in particular the height of said center of gravity, decisively determines the tilting inclination of the respective vehicle under lateral acceleration. In addition, the center of gravity of the vehicle changes with the mass of the vehicle, with the result that the actual loading of individual vehicles of the tractor-trailer combination is taken into account by using the center of gravity of the vehicle as a tilting inclination variable. The highest center of gravity of all the vehicles connected together is advantageously used for the determination of the tilting limit of the vehicle movement dynamics control system. In other words, each center of gravity of a vehicle could be assigned a respective tilting limit, wherein the lowest tilting limit of the individual vehicles determines the tilting limit which is ultimately prescribed to the vehicle movement dynamics control system.

In one preferred embodiment of the invention, the respective center of gravity of the vehicles of the tractor-trailer combination is determined on the basis of mass information of the vehicle detected at the respective vehicle, taking into account predefined vehicle information. The mass information can be here any information or measured physical variable which characterizes the mass of the vehicle. Using the mass information utilizes the fact that the center of gravity of the vehicle is determined essentially by the weight and additionally by structurally given parameters. Therefore, vehicle information which is specific to the respective type of vehicle is predefined, as a result of which the center of gravity of the vehicle can be estimated with a high degree of accuracy taking into account the detected mass.

The mass information is preferably derived from a suspension system of the respective vehicle, for example from information about the axle load.

In one particularly preferred embodiment of the invention, the mass information is made available by an electronically controlled air filter system of the respective vehicle. Such air suspension systems are known by the abbreviation "ECAS" (electronically controlled air suspension). The air suspension system ECAS comprises, inter alia, travel sensors, solenoid valves and air bellows at the individual wheels as well as a central ECAS control unit. Inter alia, information about the respective axle load is also determined and taken into account in the ECAS system, with the result that this vehicle data which is present in any case makes it possible to use the mass information according to the invention for the determination of the individual center of gravity of the vehicle.

According to an aspect of the invention, the devices for determining individual centers of gravity of the vehicles are therefore connected in a signal-transmitting fashion to the electronically controlled air suspension system of the respective vehicle. The vehicle movement dynamics control device is preferably connected to the electronically controlled air suspension systems of individual vehicles via a serial bus system, which is also referred to as a CAN="controller area network".

The mass information relating to a trailer is derived in one advantageous embodiment of the invention by taking into account the mass information of one or more other vehicles. In this way, the driving behavior is stabilized taking into account individual tilting inclinations of the vehicles of the tractor-trailer combination without tilting inclination variables being detected at each vehicle. In order to determine the mass information of the respective trailer, mass information of another vehicle of the tractor-trailer combination, which is derived, in particular, from the air suspension system of the other vehicle, is subtracted from mass information relating to the tractor-trailer combination. The mass information relating to the tractor-trailer combination is estimated here taking into account current operating variables of the tractor. Information from the engine management system, for example the torques of the engine, is preferably used as such operating variables for estimating the mass information. The operating variables permit conclusions to be drawn about the mass of the entire tractor-trailer combination which is being moved by the engine.

BRIEF DESCRIPTION OF THE DRAWINGS

Exemplary embodiments of the invention are explained in more detail below with reference to the drawing, in which.

DETAILED DESCRIPTION OF THE DRAWINGS

The drawings are provided purely for illustrative purposes and are not intended to limit the scope of the present invention.

Figure 1:
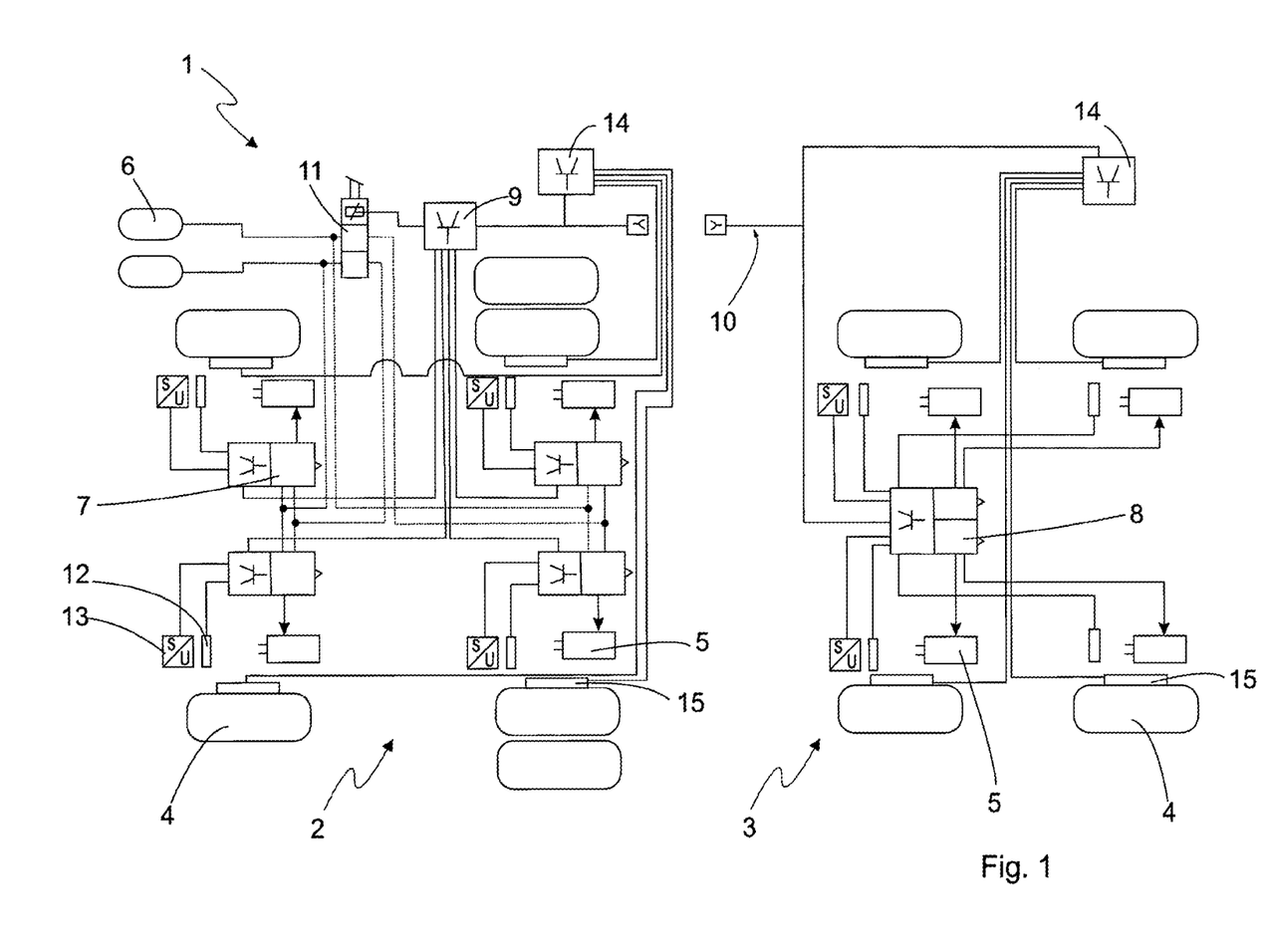
FIG. 1 shows a pneumatic and electrical circuit diagram of a vehicle movement dynamics control device.

FIG. 1 shows a pneumatic and electrical circuit diagram of an exemplary embodiment of a vehicle movement dynamics control device for a tractor-trailer combination 1 which is composed in the present exemplary embodiment of a tractor 2 and a trailer 3. The pneumatic lines are illustrated by dots in order to improve the clarity.

The vehicle movement dynamics control system comprises devices for stabilizing the driving behavior with respect to the protection against tilting (RSC function). The RSC function is explained in more detail below. In the exemplary embodiment shown, the RSC function is integrated into a vehicle movement dynamics control system which has further vehicle movement dynamics functions. The RSC function according to the invention can be implemented in any desired combination with further vehicle movement dynamics systems, in particular with a common central control unit.

All the wheels 4 of the tractor 2 and of the trailer 3 are respectively assigned pneumatic brake cylinders 5. The brake cylinders 5 are supplied pneumatically from pressure containers 6. The brake cylinders 5 are activated by pressure control modules 7, 8 which are each connected in a signal-transmitting fashion to an electronic control unit 9 via a serial bus system 10 (CAN). The bus system 10 interlinks various open-loop or closed-loop control devices in the individual vehicles and in the entire tractor-trailer combination 1.

A signal generator 11 is connected to the control unit 9. If a driver of the tractor 2 actuates the accelerator of the signal generator 11, the signal generator 11 communicates a braking request to the control unit 9. The control unit 9 calculates, as a function of the braking request and the available operating parameters, an optimum brake pressure which is prescribed to the pressure control modules 7, 8 via the bus system 10. In order to determine operating parameters continuously, the wheels 3 are each assigned rotational speed sensors 12 and pressure sensors 13.

Both the tractor 2 and the trailer 3 have an electronically controlled air suspension system (ECAS). The ECAS system of each vehicle comprises an electronic ECAS control device 14, 15 which actuates air bellows 16 which are respectively assigned to the wheels 4 via solenoid valves (not illustrated). The ECAS system also comprises travel sensors (not illustrated) which are connected in a signal-transmitting fashion to the respective control devices 14, 15. The electronic ECAS control device 14 in the tractor 2, and the electronic ECAS control device 14 in the trailer 3 as well as the ECAS control devices in further trailers are connected to the control unit 9 of the vehicle movement dynamics control device 9 via the bus system 10.

On the basis of the measured data, the electronic control unit 9 calculates setpoint values of the vehicle movement. In this context, the real vehicle behavior is continuously compared with the calculated setpoint values. If the tractor-trailer combination 1 deviates from setpoint behavior, a control intervention takes place at the brakes of one or more wheels and/or into the engine management system, wherein the drive is acted on and, for example, the torque is changed. In addition to the wheel rotational speeds via the rotational speed sensors 12 and the brake pressure via the pressure sensors 13, further driving parameters for the vehicle movement dynamics functions, such as, for example, the yaw angle rate or the steering wheel angle can be measured. Corresponding control algorithms, which implement, for example, an anti-lock brake system or a traction control system, are stored in the vehicle movement dynamics control device 23.

In this context, by obtaining a center of gravity, a tilting limit is obtained and the tilting inclination is prevented by selective control interventions into the engine management system or the drive of the tractor 2 or selective actuation of the brake cylinders 5. On the basis of the measured vehicle parameters, the current lateral acceleration is detected and a control intervention is performed. When the tilting limit, that is to say the intervention threshold for the lateral acceleration, is reached or exceeded, the tilting inclination is prevented by control intervention. The current lateral acceleration can be detected here from the measured values which are present, in particular from the individual wheel rotational speeds detected by rotational speed sensors 12 or by specially arranged lateral acceleration sensors.

Figure 2:
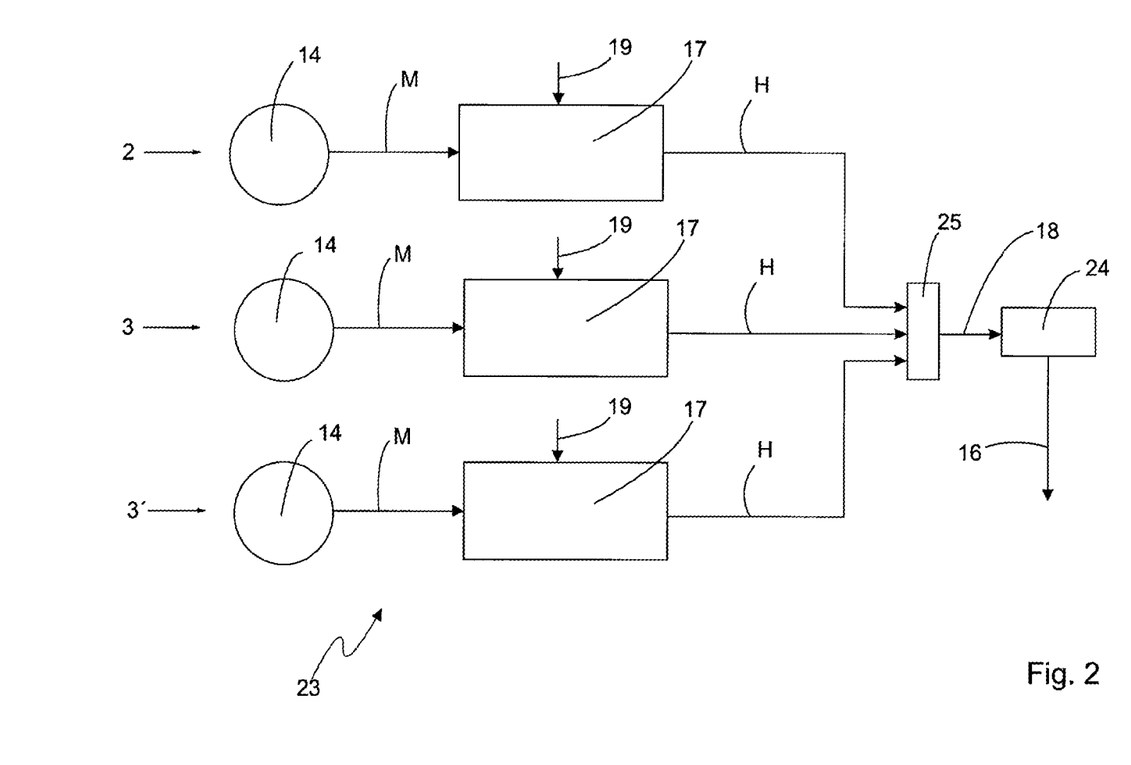
FIG. 2 shows a schematic flowchart of an exemplary embodiment of the method according to the invention for stabilizing the driving behavior taking into account tilting limits.

FIG. 2 shows a flowchart relating to the determination of the tilting limit 16 within the scope of a method for stabilizing the driving behavior of the tractor-trailer combination. In this context, the respective center of gravity H of the vehicle is determined on a plurality of vehicles of the tractor-trailer combination as a tilting inclination variable which influences the tilting inclination of the vehicle under the effect of lateral acceleration. That value 18 of the center of gravity which is decisive for the determination of the tilting limit 16 is obtained from the individual centers of gravity H of the vehicles. In the exemplary embodiment shown, the tractor-trailer combination comprises a tractor 2 and two trailers 3, 3', which each have an ECAS system and each have an ECAS control device 14. Further trailers which are equipped with ECAS can be readily taken into account during the determination of the intervention threshold for the vehicle movement dynamics control device 23.

The vehicle dynamics control device 23 comprises a plurality of determining devices 17 which are assigned to the individual vehicles of the tractor-trailer combination and have the purpose of determining respective centers of gravity H of the vehicles. The determining devices 17 can be structurally integrated here into the central control unit 9 (FIG. 1) with corresponding implementation of the described method. Mass information M is predefined by the ECAS control devices 14 of the individual vehicles as an input variable to each determining device 17 for the determination of the respective centers of gravity H of the vehicles. The mass information M is obtained here within the scope of the ECAS function and is therefore available on a vehicle-specific basis. Vehicle information 19 which is determined in advance and which characterizes the type of the respective vehicle and is invariable during operation is predefined as a further input variable to the determining devices 17 for the determination of the respective centers of gravity H of the vehicles. The specific vehicle information 19 is in the present case the gross weight of the vehicle. The specific vehicle information 19 can, however, also contain further information here, for example about the track width of the vehicle. Various data records for different types of vehicle can be stored in the control unit 9 and activated when the corresponding vehicle is coupled or used.

Figure 4:
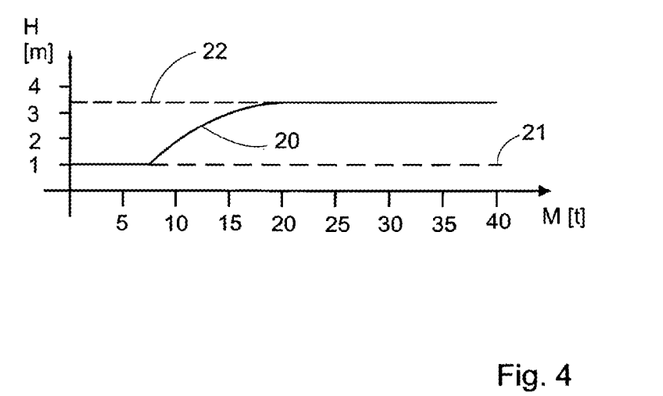
FIG. 4 shows a graphic illustration of a characteristic curve.

The respective center of gravity H of the vehicle can be estimated precisely on the basis of the mass information M of the ECAS control device 14 of the respective vehicle and the specific vehicle information 19. For this purpose, corresponding characteristic curves are stored in the control unit 9. An example of a characteristic curve for estimating the center of gravity H of the vehicle is shown in FIG. 4. The characteristic curve 20 is here the graphic profile of the height of the center of gravity H of the vehicle in meters above the mass m of the respective vehicle in tons. The lower state 21 corresponds to the unladen gross weight of the vehicle. The upper state 22 corresponds to full loading of the vehicle.

The vehicle movement dynamics control device 23 also comprises determining devices 24 for determining the tilting limit 16 from the centers of gravity H of the individual vehicles of the tractor-trailer combination. Here, the information obtained about the respective centers of gravity H of the individual vehicles is evaluated and a tilting limit 16, which is intended to form the intervention threshold of the lateral acceleration for the vehicle movement dynamics control device, is determined. The centers of gravity H of the vehicles which are obtained are related to one another in a comparative logic operation 25 and that center of gravity H of a vehicle which is the highest is used as the decisive value 18 of the center of gravity for the determination of the tilting limit 16.

Instead of the previously customary procedure in known RSC control systems in which a single characteristic curve is taken into account for a tilting limit over the entire mass of the tractor-trailer combination, individual characteristic curves 20 (FIG. 4) are obtained for each vehicle of the tractor-trailer combination. The vehicle-specific characteristic curves are used for the determination of the respective center of gravity H of the vehicle by the determining devices 17.

In other words, the lowest tilting limit of all the individual vehicles combined in the tractor-trailer combination is used for the stabilization of the driving behavior of the tractor-trailer combination within the scope of the RSC function, by using that center of gravity H of the individual vehicles which is highest as a decisive value 26 for the determination of the intervention threshold (tilting limit 16).

Figure 3:
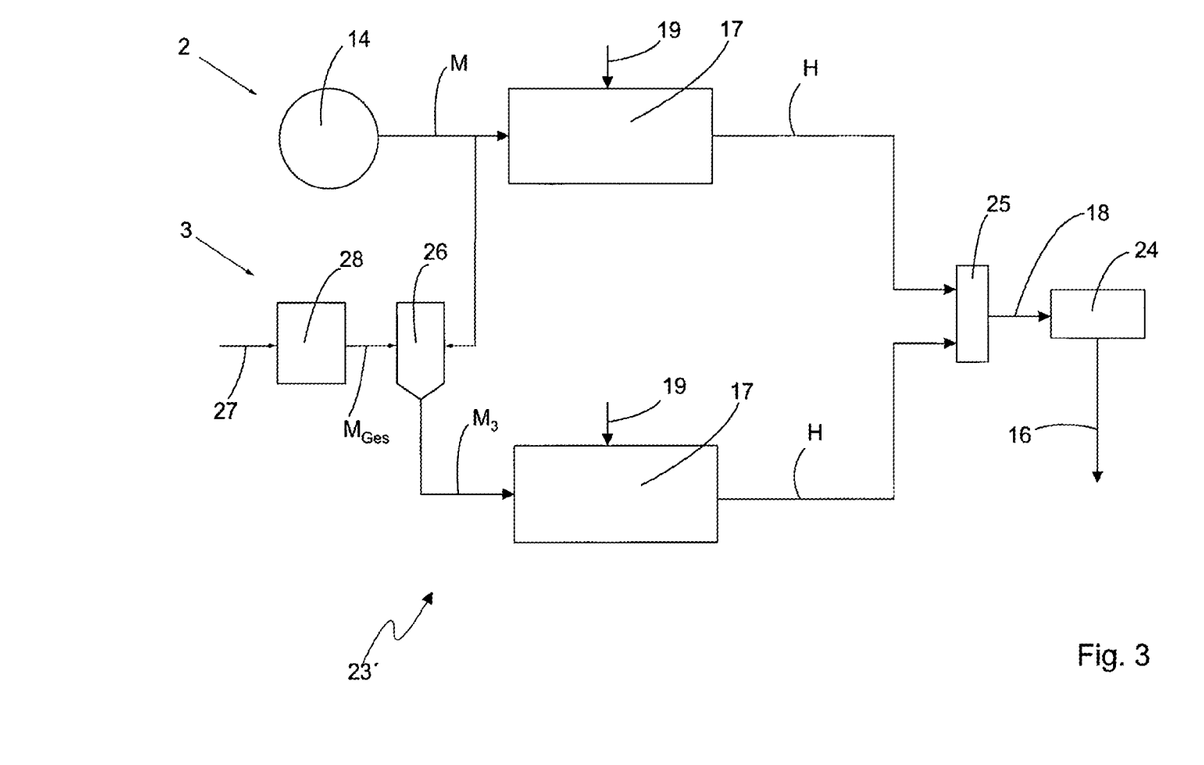
FIG. 3 shows a schematic flowchart of a further exemplary embodiment of the method according to the invention for stabilizing the driving behavior taking into account tilting limits.

FIG. 3 shows a flowchart of a further exemplary embodiment of a method for stabilizing the driving behavior of a tractor-trailer combination which comprises two vehicles, specifically a tractor 2 and a trailer 3. In contrast to the exemplary embodiment according to FIG. 2, mass information M3 is not obtained from information from devices of the trailer 3 but instead the mass information M3 of the trailer 3 is obtained by subtracting the mass information M of the tractor 2 of the mass information MGes relating to the tractor-trailer combination. The vehicle movement dynamics control device 23' comprises for this a subtractor element 26 which receives as the minuend the mass information MGes relating to the tractor-trailer combination and as the subtrahend the mass information M of the tractor 2. The output variable of the subtractor element 26 is the value of the difference between the minuend and the subtrahend, which is received as mass information M3 of the trailer 3 in the vehicle movement dynamics control device 23' and processed as in the exemplary embodiment in FIG. 2. The mass information M relating to the tractor 2 is made available by the ECAS control device 14 of the tractor 2, as in the exemplary embodiment according to FIG. 2.

The mass information MGes relating to the tractor-trailer combination is estimated taking into account current operating variables 27 of the tractor. In the exemplary embodiment shown, the torques of the drive engine are evaluated as the operating variable of the tractor. The vehicle movement dynamics control device 23' comprises an estimator device 28 which draws conclusions about the mass moved by the drive engine on the basis of the detector torques of the drive engine or other engine information, said mass being assumed to be the mass of the entire tractor-trailer combination.

In this way, a device for stabilizing the driving behavior of a tractor-trailer combination taking into account the individual masses of the combined vehicles is made available which does not require any measured values from the trailer 3.

While the above description constitutes the preferred embodiments of the present invention, it will be appreciated that the invention is susceptible to modification, variation and change without departing from the proper scope and fair meaning of the accompanying claims.

What is claimed is:

1. A method for stabilizing the driving behavior of a tractor-trailer combination (1) comprising a plurality of vehicles, the method comprising the steps of
    obtaining a tilting inclination variable; and
    determining a tilting limit (16) on the basis of the tilting inclination variable;
    prescribing the tilting limit to a vehicle movement dynamics control system acting on at least one of a drivetrain or brakes of the tractor-trailer combination (1) to prevent tilting inclination by selective control interventions into an engine management system or a drive of a tractor (2) or by selective actuation of brake cylinders (5),
    wherein a respective individual tilting inclination variable is determined at a plurality of vehicles of the tractor-trailer combination (1), and a value (18) of the tilting inclination variable which is decisive for the determination of the tilting limit (16) is selected from the respective individual tilting inclination variables.

2. The method as claimed in claim 1, wherein the respective individual tilting inclination variable of such a vehicle of the tractor-trailer combination (1), which inclines most to tilting, is selected as the tilting inclination variable for the determination of the tilting limit (16).

3. The method as claimed in claim 1, wherein a center of gravity (H) of at least one of the plurality of vehicles is determined as the respective individual tilting inclination variable, wherein the highest center of gravity (H) of the plurality of vehicles is used for the determination of the tilting limit (16) of the vehicle movement dynamics control system.

4. The method as claimed in claim 3, wherein the center of gravity (H) of the at least one of the plurality of vehicles is determined on the basis of mass information (M) detected at the at least one of the plurality of vehicles, taking into account predefined specific vehicle information (19).

5. The method as claimed in claim 4, wherein the mass information (M) is derived from a suspension system of the at least one of the plurality of vehicles.

6. The method as claimed in claim 4, wherein the mass information (M) is made available by a control device (14) of an electronically controlled air suspension system of the at least one of the plurality of vehicles.

7. The method as claimed in claim 4, wherein the mass information (M3) relating to an individual vehicle (3) of the tractor-trailer combination (1) is determined by subtracting mass information (M) of another vehicle of the tractor-trailer combination (1) from mass information (MGes) relating to the tractor-trailer combination (1), which mass information (MGes) is estimated taking into account current operating variables (L) of the tractor (2).

8. A vehicle movement dynamics control device comprising
    a control unit (9) configured for acting on at least one of a drivetrain or brakes of a tractor-trailer combination (1)
    a plurality of variable-determining devices (17) which are assigned to individual vehicles of the tractor-trailer combination (1) and are configured for determining respective tilting inclination variables of the individual vehicles and for obtaining a value (26) of a decisive tilting inclination variable for determining a tilting limit (16) from centers of gravity (H) of the vehicles, and limit-determining devices (24) for determining the tilting limit (16) from the value (26) of the decisive tilting inclination variable, wherein the control unit (9) is configured to prevent tilting inclination by selective control interventions into an engine management system or a drive of a tractor (2) or by selective actuation of brake cylinders (5) based on the tilting limit.

9. The vehicle movement dynamics control device as claimed in claim 8, wherein the variable-determining devices (17) are configured to determine respective tilting inclination variables and for determining a center of gravity (H) for each of the individual vehicles.

10. The vehicle movement dynamics control device as claimed in claim 9, wherein the variable-determining devices (17) for determining respective centers of gravity (H) of the vehicles are connected in a signal-transmitting fashion to a control device (14) of an electronically controlled air suspension system of the individual vehicles.

11. The vehicle movement dynamics control device as claimed in claim 9, wherein the vehicle movement dynamics control device (23) is connected to control devices (14) of electronically controlled air suspension systems of the individual vehicles via a serial bus system (10).

* * * * *